(12) United States Patent
Shureb

(10) Patent No.: US 6,460,525 B1
(45) Date of Patent: Oct. 8, 2002

(54) SEPARATOR AND OIL TRAP FOR CLOSED CRANKCASE VENTILATOR SYSTEMS

(75) Inventor: Robert Francis Shureb, Farmington Hills, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/061,789

(22) Filed: Feb. 4, 2002

Related U.S. Application Data

(62) Division of application No. 09/748,458, filed on Dec. 27, 2000, now Pat. No. 6,345,614.

(51) Int. Cl.$^7$ ............................................... F02B 25/06
(52) U.S. Cl. ...................... 123/572; 123/573; 123/41.86
(58) Field of Search ................................. 123/572, 573, 123/574, 41.86

(56) References Cited

U.S. PATENT DOCUMENTS

| | | | | | |
|---|---|---|---|---|---|
| 4,627,406 A | * | 12/1986 | Namiki et al. | ............... | 123/573 |
| 5,022,376 A | * | 6/1991 | Hudson, Jr. et al. | ......... | 123/572 |
| 5,417,184 A | * | 5/1995 | McDowell | ............... | 123/41.86 |
| 5,450,835 A | * | 9/1995 | Wagner | ....................... | 123/573 |
| 5,507,268 A | * | 4/1996 | Schlattl | ....................... | 123/572 |
| 6,345,614 B1 | * | 2/2002 | Shureb | ....................... | 123/572 |

* cited by examiner

Primary Examiner—Marguerite McMahon
(74) Attorney, Agent, or Firm—Bill C. Panagos

(57) ABSTRACT

A separator for a closed crank case ventilation system has an upstream located inlet and downstream gas and oil outlets. A plurality of flat plate baffles alternately extend from opposing side walls to form a tortuous path for blow by gasses to separate the oil from the gasses. The separator is located upstream from the crankcase depression regulator such that the pressure differential between the separator and the crankcase is minimal to allow the oil to easily open the check valve and return to the crankcase.

6 Claims, 3 Drawing Sheets

SEPARATOR AND OIL TRAP FOR CLOSED CRANKCASE VENTILATOR SYSTEMS

This is a divisional application and the assignment document for the patent application Ser. No. 09/748,458 was filed on Dec. 27, 2000 now U.S. Pat. No. 6,345,614.

TECHNICAL FIELD

The field of this invention relates separators in a closed crankcase ventilation system.

BACKGROUND OF THE DISCLOSURE

Government regulations relating to environmental concerns have mandated that many engines have a closed crankcase ventilation system. Commonly, these closed systems re-circulate any blow-by gases escaping from the combustion chambers and passing into the crankcase back into the air intake system. These blow-by gases, which are loaded with unburned gaseous hydrocarbons, are then re-circulated back to the intake manifold to be burned upon the next pass into the engine.

However, the crankcase gases are also usually loaded with oil particulates. Under extreme conditions, excess oil passing through the intake system may cause harm to the engine and cause more pollutants than what was being eliminated by the re-circulation of the blow-by gases. Thus, oil needs to be separated out before the gases are reintroduced into the air intake system of the engine and re-burned.

One present in-line closed re-circulation system is disclosed in U.S. Pat. No. 4,724,807 which has an in-line separator made with conduits with arcuate channel walls forming a convoluted arcuate pathway for the exhaust gas/oil mixture. The separator is interposed between the clean air intake filter and the turbo-compressor air inlet system. The position of this separator requires that the separator have a moderately small size to fit between the air filter and turbo intake and requires that it be downstream from the crankcase depression regulator. These factors limit the capacity and effectiveness of the separator returning oil against a substantial differential pressure to the positively pressured crankcase.

What is needed is an expeditiously constructed separator system that has enough capacity to prevent oil from entering the air intake in a cylinder kit failure situation and eliminates the resistance of draining oil back into a positively pressurized crankcase.

In addition, there is a need for a separator system that protects the engine against a sudden increase in oil discharge due to operating conditions, including extreme tilt of the engine during operation.

SUMMARY OF THE DISCLOSURE

In accordance with one aspect of the invention, a closed crankcase re-circulation system for an internal combustion engine includes an exhaust gas-oil separator operably interposed between an engine breather and a crankcase depression regulator. The exhaust gas-oil separator has an inlet in communication with an outlet of an engine breather for communication with the internal space of the crankcase. Commonly, the engine breather may be mounted in the rocker arm cover with the engine block and cylinder heads having passages to the crankcase.

A gas outlet is in communication with a line leading to an air intake system of the engine. The gas outlet is positioned at a high portion of the separator. The line has a crankcase depression regulator mounted downstream from the separator. An oil drain outlet is in communication with the crankcase for draining oil back thereto.

Preferably the separator is longitudinally extending from the inlet to the outlet and drain. The oil drain outlet is at a lower portion of the separator. Baffles are interposed between the inlet and the gas and oil drain outlets. Preferably the baffles transversely and alternately extend from opposite sides of the separator to form a convoluted passage for the blow by gasses as they pass from the inlet to the gas outlet.

The separator desirably has a floor surface canted downwardly from the inlet to the oil drain outlet with the oil drain outlet located at a low portion of the canted floor surface to provide for flow of the separated oil to the oil drain outlet.

In one embodiment the separator has a generally frusto-conical shape extending from the inlet to the gas outlet and oil drain outlet. In this embodiment, it is preferable that each baffle has an oil drain passage located at a low lateral point at the floor surface to provide for downward flow of the oil through the baffle and toward the drain. It is also preferable that a filter media is interposed between an end wall in proximity to the gas outlet and a last downstream baffle. The filter media is operable interposed between the gas outlet and the oil drain outlet.

In another embodiment, the separator has a generally rectangular shape in plan view with vertical sidewalls and vertical end walls. The floor surface is generally flat in the lateral direction. The baffles alternately extend from the vertical sidewalls. It is desirable in this embodiment that the inlet is positioned at an upper section of one end wall adjacent a higher end of the floor surface. The gas outlet is positioned at an upper section of an opposite end wall adjacent to the lower end of the floor surface. The oil drain outlet is positioned at a lower section of the opposite end wall.

In accordance with another aspect of the invention, a separator for a closed crankcase ventilating system includes a generally longitudinally and horizontally extending body with an inlet at an upstream end and a gas outlet and oil drain outlet at a downstream end. The separator has a floor surface canted downwardly from the upstream end to the downstream end. The oil drain outlet is located at a low portion of the canted floor surface. A plurality of baffles transversely extend laterally within the body and are alternately to opposite sides of the body.

Preferably, the separator body has a generally frusto-conical shape extending from the inlet to the gas outlet and oil drain outlet. Preferably, each baffle has an oil passage located at a low lateral point at the floor surface to provide for downward flow of the oil through the baffle and toward the oil drain outlet.

In this fashion, a separator has the efficiency and capacity to adequately separate sufficient oil form the crankcase gases in a situation where a cylinder kit fails which significant blow by of oil and blow by gasses pass into the crankcase. In this way, the air intake system and turbo charge system are more adequately protected when a cylinder kit failure occurs.

BRIEF DESCRIPTION OF THE DRAWINGS

Reference now is made to the accompanying drawings in which.

DETAILED DESCRIPTION OF THE PREFERRED EMBODIMENT

Figure 1:
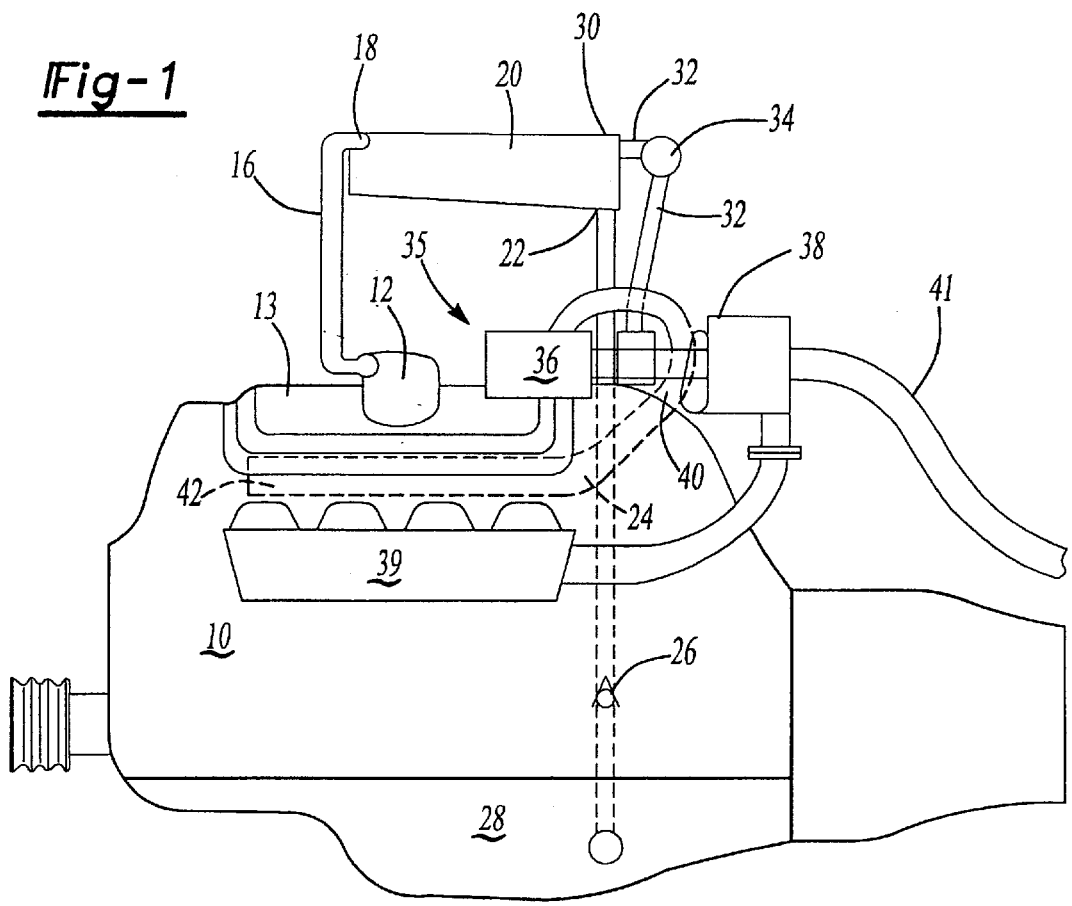
FIG. 1 is a side elevational view of an engine incorporating a separator in accordance with one embodiment of the invention.

Referring now to FIG. 1, an engine 10 has an oil breather 12 connected to the rocker arm cover 13. The breather 12 is connected to a line 16 that is connected to an inlet 18 of a separator 20 often referred to as an air-oil separator. The separator 20 has a drain outlet 22 connected to a line 24, preferably with a one way check valve 26 therein that leads back to the crankcase 28 in engine 10. The oil breather 12 is conventionally in communication with the crankcase 28 via passages through the engine block and cylinder head that are not shown for simplicity of the drawing.

The separator 20 also has an outlet 30 that is connected to a line 32 that has a crankcase depression regulator 34. The line 32 extends beyond the crankcase depression regulator 34 and is connected to the air intake system generally indicated at 35. The air intake system 35 has an air intake 36 and turbocharger 38 which has a line 40 leading back into the intake manifold 42. The turbocharger 38 is driven by exhaust gases passing from exhaust manifold 39 to exhaust line 41.

Figure 2:
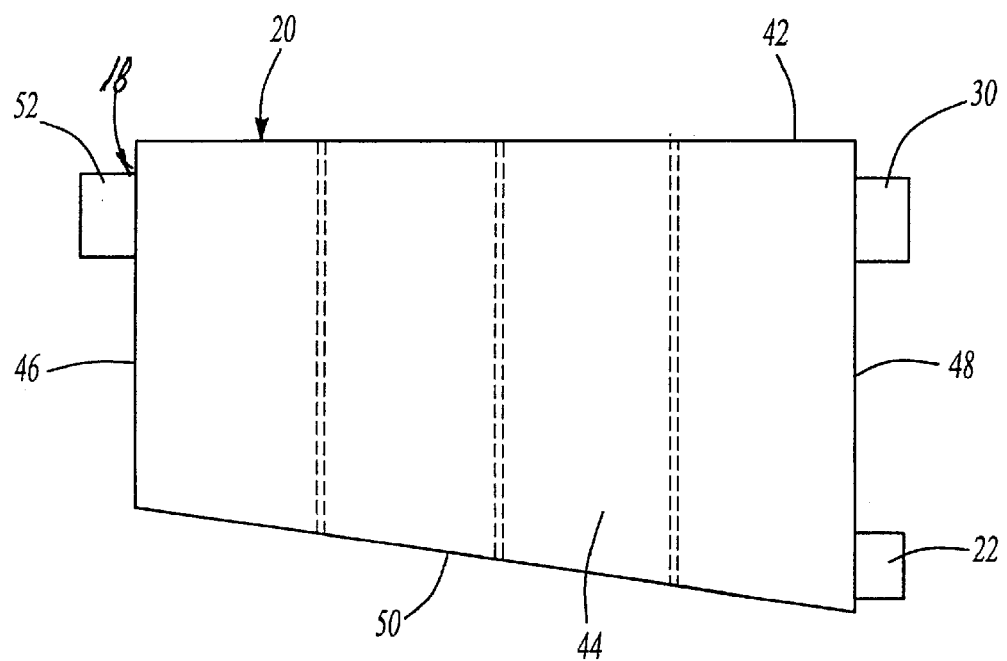
FIG. 2 is an enlarged side elevational view of the separator shown in FIG. 1.
Figure 3:
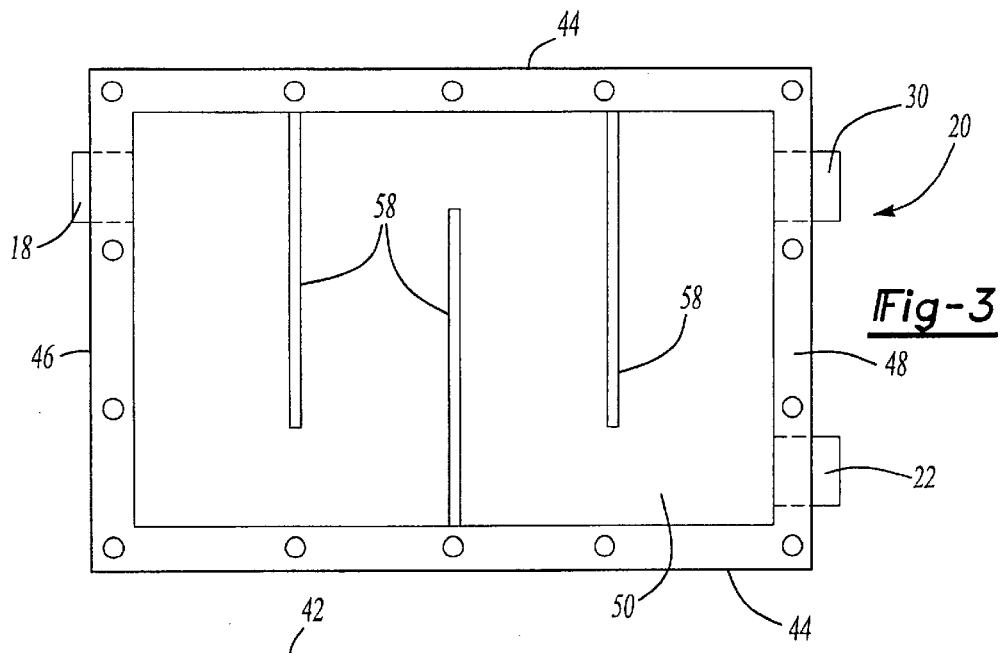
FIG. 3 is a plan view of the separator with the top removed for viewing the baffles therein.
Figure 4:
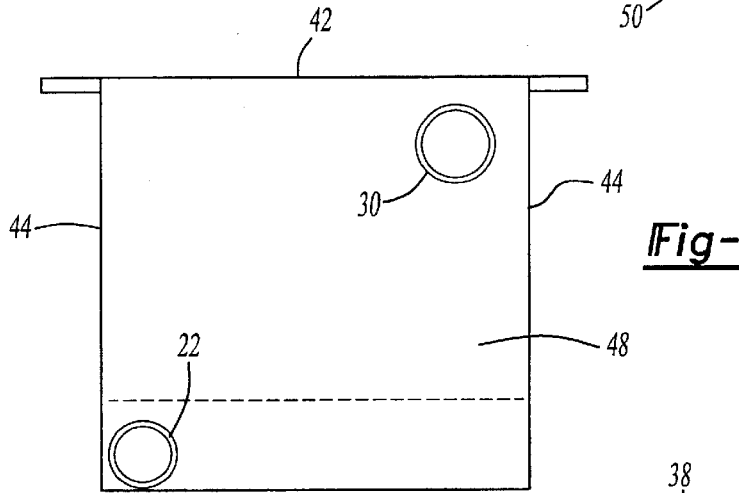
FIG. 4 is an end view of the downstream end of the separator.
Figure 5:
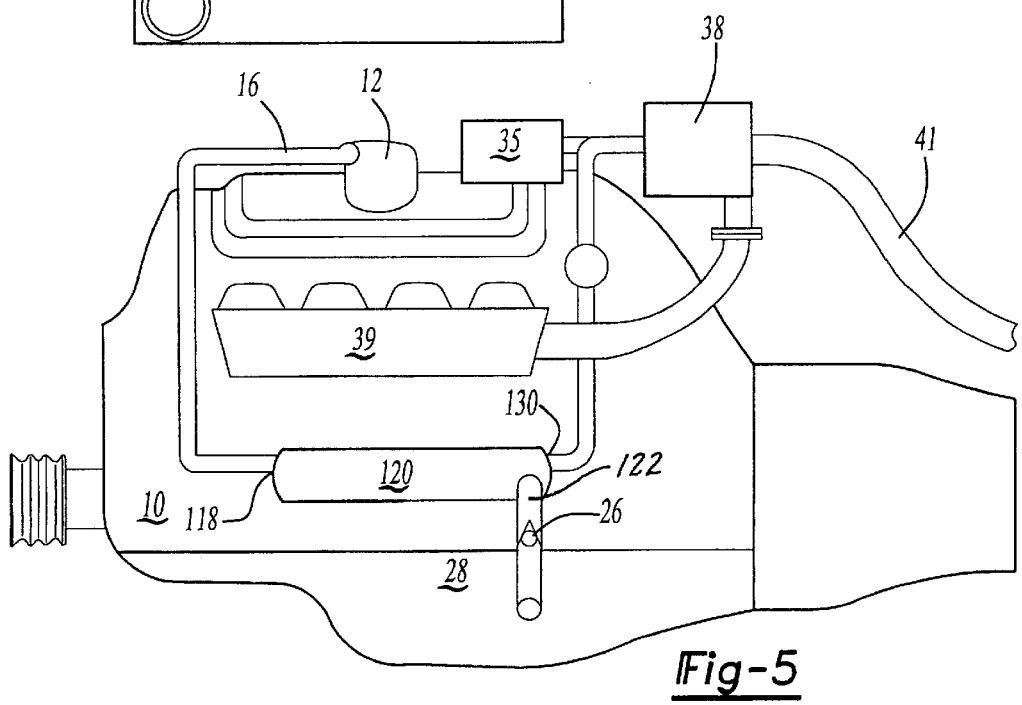
FIG. 5 is a view similar to FIG. 1 illustrating a second embodiment of the invention.
Figure 6:
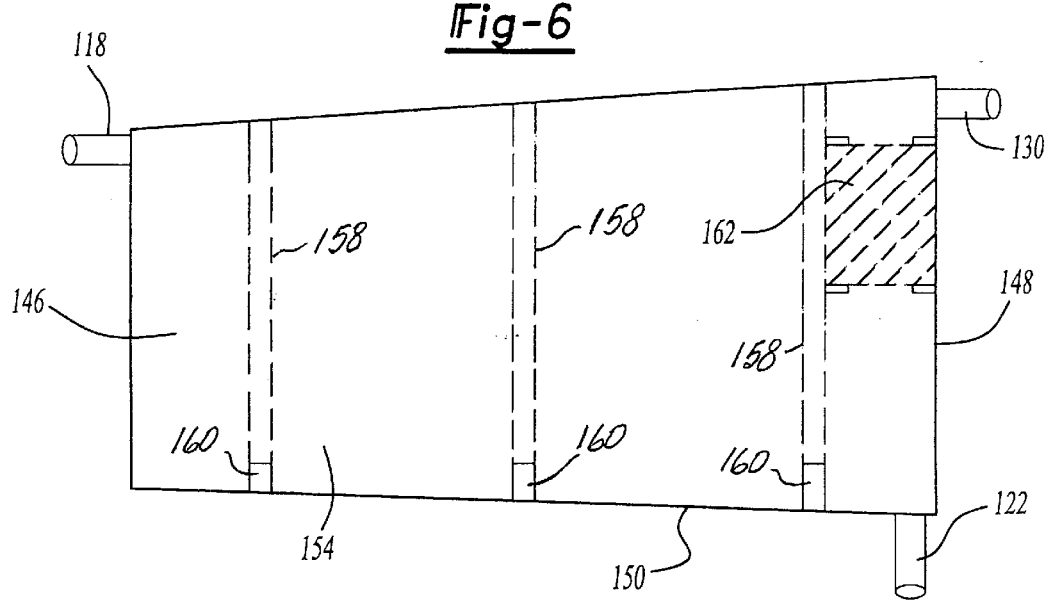
FIG. 6 is an enlarged side elevational and partially segmented view of the separator shown in FIG. 5.

The separator 20 can be described in more detail with reference to FIGS. 2–4. As shown in these figures, the general shape of the separator 20 is rectangular in the plan view as shown in FIG. 3. The separator has a flat top 42 with vertical opposing side walls 44, vertical opposing inlet end wall 46 and downstream end wall 48 and a sloping or canting floor surface 50 as shown in FIG. 2. This shape is more conducive to packaging or placing the air oil separator 20 above the engine where a wide flat shape is desirable for packaging purposes.

The floor surface 50 slopes downwardly from the inlet end wall 46 to the outlet end wall 48. The inlet 18 intrudes at an upper section of the inlet end wall 48. The inlet 18 may be an extending inlet pipe 52 for allowing a line to be easily coupled thereto. The downstream end wall has an oil drain outlet 22 at a lower section at the floor surface and a gas outlet 30 at an upper end of the end wall 48. As shown in FIG. 4, the two outlets 30 and 22 are placed at opposing corners of the downstream end walls and may be similarly constructed to inlet 18 with an extending pipe 52.

As shown in FIG. 3, a plurality of flat plate baffles 58 extend from the two side walls 44 in alternating fashion to provide a zig-zag convoluted path for the gas and oil flow within the separator to provide sufficient length and turbulence to drop the oil particulates from the blow-by gasses during the gasses tortuous path through the oil gas separator. The dropped oil flows on the floor surface 50 following the convoluted path along the downward slope to the drain outlet 22. The oil then passes through the connected line 24 and through the one way check valve 26 and back to the crankcase 28. The pressure differential between the separator and the crankcase is insignificant because crankcase depression regulator 80 is downstream from the separator. Thus, the mere weight of the oil is sufficient to open the check valve 26 and allow the oil to reenter the crankcase. The gases also continue along the tortuous path provided by the baffles to the upper gas outlet 30. The gasses pass the crankcase depression regulator 80 and back into the air intake system.

The separator 20 is sized sufficiently to provide for substantial separation of oil from blow by gasses in the event that a cylinder kit completely fails. While this size varies with relation to the size of the engine and size of the cylinders, an air oil separator having the interior dimensions of 12 inches in length, 8 inches in width and 6 to 8 inches in depth is sufficient size for an engine such as a commercially available Detroit Diesel Series 2000® marine pleasure craft engine. The baffles will cause an average minimum path length of approximately 24 inches for this dimensioned separator between the inlet and gas outlet. Additional plate baffles will increase the path length from this disclosed preferred embodiment.

A second embodiment is disclosed in FIGS. 5–8. In this embodiment the separator 120 is placed along the side of the engine 10. The outer shape of the separator 120 has a substantially frusto-conical tubular wall 154 with a longitudinal axis. The tubular wall 154 is capped at each end with vertical upstream end wall 146 and downstream end wall 148. The longitudinal axis of the separator 120 is generally horizontal such that it has a downwardly sloping or canting floor surface 150 as shown in FIG. 2. This shape is a more conducive package when the separator 120 is positioned at a side of the engine 10. Usually a relatively narrow and longer shape is desirable for packaging purposes at a side of an engine.

Figure 7:
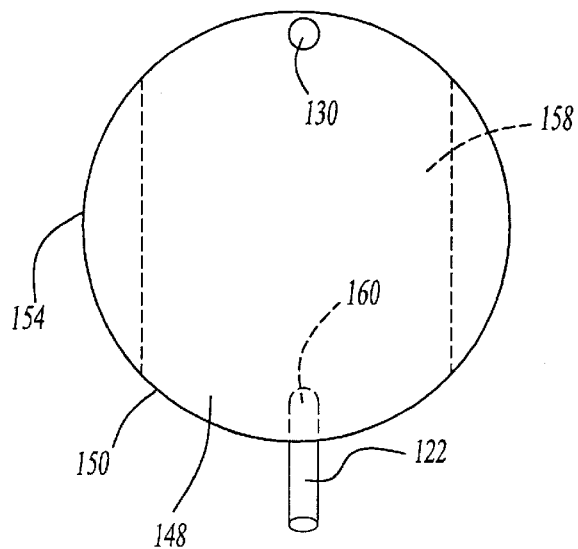
FIG. 7 is an end view from the downstream end of the separator shown in FIG. 6.

The floor surface 150, which is merely a lower section of the frusto conical body wall 154, slopes downwardly from the inlet end wall 46 to the outlet end wall 48. An inlet 118 intrudes at an upper section of the inlet end wall 148. The downstream end wall 148 has a gas outlet 130 at an upper end of the end wall 148. An oil drain outlet 122 extends from the lower end of the floor surface 150 adjacent the end wall 148. As shown in FIG. 7, the two outlets 130 and 122 are both near the center vertical longitudinal plane of the air oil separator.

Figure 8:
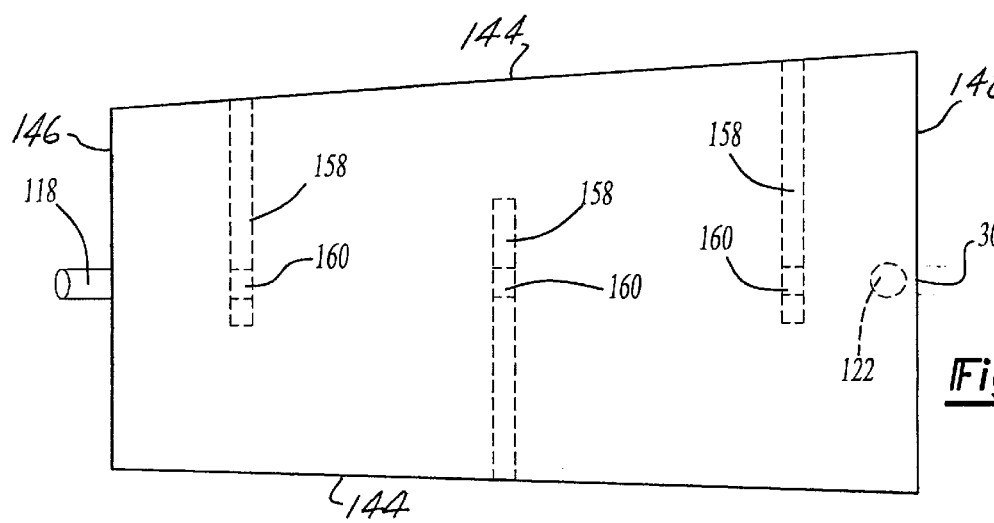
FIG. 8 is a top plan view showing the alternating baffles within the separator.

As shown in FIG. 8, a plurality of straight plate baffles 158 extend from the opposing side sections 144 of the frusto conical body wall in alternating fashion to provide a zig-zag convoluted path for the gas flow within the separator to provide sufficient length and turbulence to drop the oil particulates from the entering crankcase blow-by gasses during its tortuous path through the oil gas separator. This dropped oil then flows from the point that it drops onto the floor surface 150 to a lower midpoint in proximity to the vertical center plane. Each baffle 158 has a flow through passage 160 along the vertical midplane to allow the oil to flow down the floor surface 150 to the oil drain outlet 154. The oil then passes through the connected line 24 and through the one way check valve 26 and back to the crankcase oil supply in the same fashion as with the first previously described embodiment.

As shown in FIG. 7, an optional filter 162 may be interposed between the last downstream baffle 158 and the downstream end wall 148 such that all blow by gasses must pass up through the filter 162 to reach the outlet 152. The filter provides further chances for remaining oil particles to condense or hit the filter and drop back onto the floor surface 150 and pass to the oil drain outlet 154.

The length and inner upstream and downstream diameters for the frusto conical body again can vary with the particular application. It is foreseen that for the above mention commercially available engine, a length of 12 inches and upstream and downstream inside diameters of 6 and 8 inches, respectively is suitable dimensions for a Detroit Diesel 2000 marine pleasure craft engine.

In this fashion, substantially all significant amounts of oil are separated from the blow by gasses that enter the separator before the blow by gasses are returned to the intake manifold. The oil is easily returned to the crankcase thereby preventing any back up of blocked conditions. Furthermore, the separator is easily constructed with flat plate baffles housed in an easily constructed housing.

Variations and modifications are possible without departing from the scope and spirit of the present invention as defined by the appended claims or plan.

The embodiments in which an exclusive property or privilege is claimed are defined as follows:

1. A closed crankcase re-circulation system for an internal combustion engine, comprising:
   a separator operably interposed between an engine breather connected to a crankcase and a crankcase depression regulator,
   said separator having an inlet in communication with said engine breather, a gas outlet in communication with a line leading to an air intake system of said engine with said line having a crankcase depression regulator therein, and an oil drain outlet in communication with said crankcase for draining oil back thereto;
   said gas outlet being position at a high portion of said separator;
   said oil drain being at a lower portion of said separator;
   said separator has a generally frustro-conical shape longitudinally extending from said inlet to said gas outlet and drain outlets; said separator having a flat top with vertically opposing sidewalls, vertically opposing inlet wall and downstream end wall, and a floor surface canted downwardly from said oil drain outlet with said oil drain outlet located at a low portion of said canted floor surface, and;
   a plurality of baffles interposed between said inlet and said gas outlet and said oil drain outlet, said baffles transversely extend laterally and alternate connection with opposite sides of said separator for providing a tortuous path for blow by gasses entering said separator.

2. A closed crankcase re-circulation system as defined in claim 1, wherein each baffle has an oil flow through passage located at a low lateral point at said floor surface to provide for downward flow of said oil through said baffle and toward said drain outlet.

3. A closed crankcase re-circulation system as defined in claim 2, wherein a filter media is interposed between an end wall in proximity to said gas outlet and a last downstream baffle; said filter media being interposed between said gas and drain outlets.

4. An air-oil separator for a closed crankcase ventilating system, comprising;
   a generally longitudinally and horizontally extending frustro conical shape body with an inlet at an upstream end and an outlet and oil drain outlet at a downstream end;
   said separator having a floor surface canted downwardly from said upstream end to said downstream end;
   said drain outlet located at a low portion of said canted floor surface;
   a plurality of flat plate baffles transversely extend laterally within said body and being connected alternately to opposite sides of said body.

5. An air-oil separator for a closed crankcase re-circulation system as defined in claim 2, wherein each baffle has an oil flow through passage located at a low lateral point at said floor surface to provide for downward flow of said oil through said baffle and toward said drain outlet.

6. An air-oil separator for a closed crankcase re-circulation system as defined in claim 3, wherein a filter media is interposed between an end wall in proximity to said outlet and a last downstream baffle; said filter media being interposed between said outlet and said drain.

* * * * *